United States Patent [19]
Caccuro et al.

[11] Patent Number: 5,440,615
[45] Date of Patent: Aug. 8, 1995

[54] LANGUAGE SELECTION FOR VOICE MESSAGING SYSTEM

[75] Inventors: John A. Caccuro, Holmdel; Ronald D. Slusky, Highland Park, both of N.J.

[73] Assignee: AT&T Corp., Murray Hill, N.J.

[21] Appl. No.: 860,943

[22] Filed: Mar. 31, 1992

[51] Int. Cl.$^6$ .......................... H04M 3/50; H04Q 3/72
[52] U.S. Cl. ...................... 379/67; 379/207; 379/213; 379/246
[58] Field of Search ............ 379/88, 89, 67, 213, 379/207, 220, 221, 125, 126, 127, 245, 246

[56] References Cited

U.S. PATENT DOCUMENTS

| | | | |
|---|---|---|---|
| 4,555,594 | 11/1985 | Friedes et al. | 379/220 |
| 4,790,003 | 12/1988 | Kepley | 379/88 |
| 5,136,633 | 8/1992 | Tejada et al. | 379/91 |

OTHER PUBLICATIONS

"Voice-Response System Allows Fast Cargo-Tracking", Saru Diamond, *Telecommunications*, vol. 24, No. 10, Oct. 1990, p. 69.

"Automation of Alternate Billed Calls Using Speech Recognition", Michael Murphy et al., *IEEE Communications Mag.*, Jan. 1991, pp. 25–29.

*Primary Examiner*—Thomas W. Brown
*Attorney, Agent, or Firm*—Barry H. Freedman

[57] ABSTRACT

A voice messaging system is designed to select an announcement for a caller based on source information associated with a call initiated by that caller. The voice messaging system a) compares at least a portion of the source information to a stored language code selection list that associates particular call origination locations with predominant language(s) spoken at those locations, and b) based on the results of the comparison, delivers the system's message to the caller in the language that is most likely understood by the caller.

12 Claims, 8 Drawing Sheets

FIG. 4

| ORIGINATING COUNTRY CODE | COUNTRY NAME | NUMBER OF DOMINANT LANGUAGES | DOMINANT LANGUAGE(S) |
|---|---|---|---|
| 32 | BELGIUM | 2 | FRENCH FLEMISH |
| 39 | ITALY | 1 | ITALIAN |
| 46 | SWEDEN | 1 | SWEDISH |
| 48 | POLAND | 1 | POLISH |
| 54 | ARGENTINA | 1 | SPANISH |
| 55 | BRAZIL | 1 | PORTUGUESE |
| 61 | AUSTRALIA | 1 | ENGLISH |
| 81 | JAPAN | 1 | JAPANESE |
| 82 | KOREA | 1 | KOREAN |
| 86 | CHINA | 2 | MANDARIN CANTONESE |
| 90 | TURKEY | 1 | TURKISH |
| 213 | ALGERIA | 1 | ARABIC |

FIG. 5

| ORIGINATING COUNTRY CODE | COUNTRY NAME | AREA/TRUNK CODE | LANGUAGE PRIORITY ARRAY |
|---|---|---|---|
| 032 | BELGIUM | 2 | FRENCH FLEMISH |
| | | 3 | FLEMISH FRENCH |
| | | NO AREA/TRUNK CODE | FRENCH FLEMISH |
| 041 | SWITZERLAND | 31 | GERMAN FRENCH ITALIAN ROMANSCH |
| | | 22 | FRENCH GERMAN ITALIAN ROMANSCH |
| | | 41 | GERMAN FRENCH ITALIAN ROMANSCH |
| | | 1 | GERMAN FRENCH ITALIAN ROMANSCH |
| | | NO AREA/TRUNK CODE | GERMAN FRENCH ITALIAN ROMANSCH |

*FIG. 6*

| ORIGINATING COUNTRY CODE | COUNTRY NAME | AREA/TRUNK CODE | NUMBER OF DOMINANT LANGUAGES | DOMINANT LANGUAGES |
|---|---|---|---|---|
| 001 | USA | 201<br>202<br>⋮<br>908 | 1 | ENGLISH |
| 001 | BAHAMAS | 809 | 1 | ENGLISH |
| 001 | CANADA | 204<br>205<br>⋮<br>807 | 2 | ENGLISH<br>FRENCH |
|  |  | 514<br>418<br>819 |  | FRENCH<br>ENGLISH |

LANGUAGE SELECTION FOR VOICE MESSAGING SYSTEM

TECHNICAL FIELD

This invention relates to voice messaging systems, and more specifically, to a system and method for selecting particular announcements provided by voice messaging systems.

BACKGROUND OF THE INVENTION

Because of the wealth of features offered by voice messaging systems, the last few years have witnessed an explosive growth in the use of such systems to meet communication needs that do not require direct person-to-person interactions. In such systems, the caller is ordinarily invited by a personalized or system announcement to leave a message because the called party is busy or unavailable. Alternatively, an announcement can provide a caller with various types of information, such as an initial prompting command or an alternate telephone number at which the called party may be reached. Typically, these announcements are pre-recorded in a particular language by the voice messaging system administrator or the called party. Unfortunately, the inflexibility of this approach prevents voice messaging systems users who do not share a common language to take full advantage of the communications benefits of such systems. The effects of this deficiency are manifested when an international caller is greeted by an incomprehensible foreign language announcement from a voice message system. As a result of the somewhat obscure nature of the greeting or announcement, the international caller and the called party are deprived of the full benefit of the voice messaging system. For example, callers are unable to verify that they have reached the right called party and consequently, may forego the opportunity to leave messages of a personal or confidential nature, notwithstanding the expense of the call. Similarly, any information provided by the announcement falls on "deaf ears".

This one-language limitation of the prior art takes on particular significance when one considers a) the increasing use of voice messaging systems in international communications (especially between countries with significant time zone differences) and b) the wide variety of languages spoken by users of voice messaging systems.

SUMMARY OF THE INVENTION

This invention is directed to the selection by a voice messaging system of a pre-recorded announcement to be played to a caller in a language determined, based on source information that is associated with the call and that is indicative of where the call originated. In an illustrative embodiment of the invention, a voice messaging system receives the caller's Calling Line Identity (CLI) or equivalent information, such as the originating country code, and/or the area code. The voice messaging system a) compares the originating country code of the caller to a stored language code selection list that associates particular call origination locations with predominant language(s) spoken at those locations, and b) based on the results of the comparison, delivers the system's messages to the caller in the language that is most likely understood by the caller.

In accordance with a feature of the invention, the voice messaging system may invite a caller from a multilingual country to select a preferred language for an announcement from a list of languages derived from matching the caller's country code and/or area code to corresponding fields in a stored selection table. Language selection is offered to the caller, via short prompting announcements delivered by the voice messaging system, in descending order of language dominance. When the caller selects a particular language, the voice messaging system thereafter delivers all further system messages in that language.

BRIEF DESCRIPTION OF THE DRAWING

In the drawing:

FIG. 4 is a table illustrating a list of countries with corresponding country codes and dominant languages that may be stored in a database of the voice messaging system;

FIG. 5 illustrates an exemplary language priority table that may be stored in the database, and that indicates the order of language dominance for different regions of a particular country; and FIG. 6 is a table illustrating a list of some countries in the North American Dialing Plan with corresponding country codes and dominant languages that may be stored in a database of the voice messaging system;

DETAILED DESCRIPTION

Figure 1:
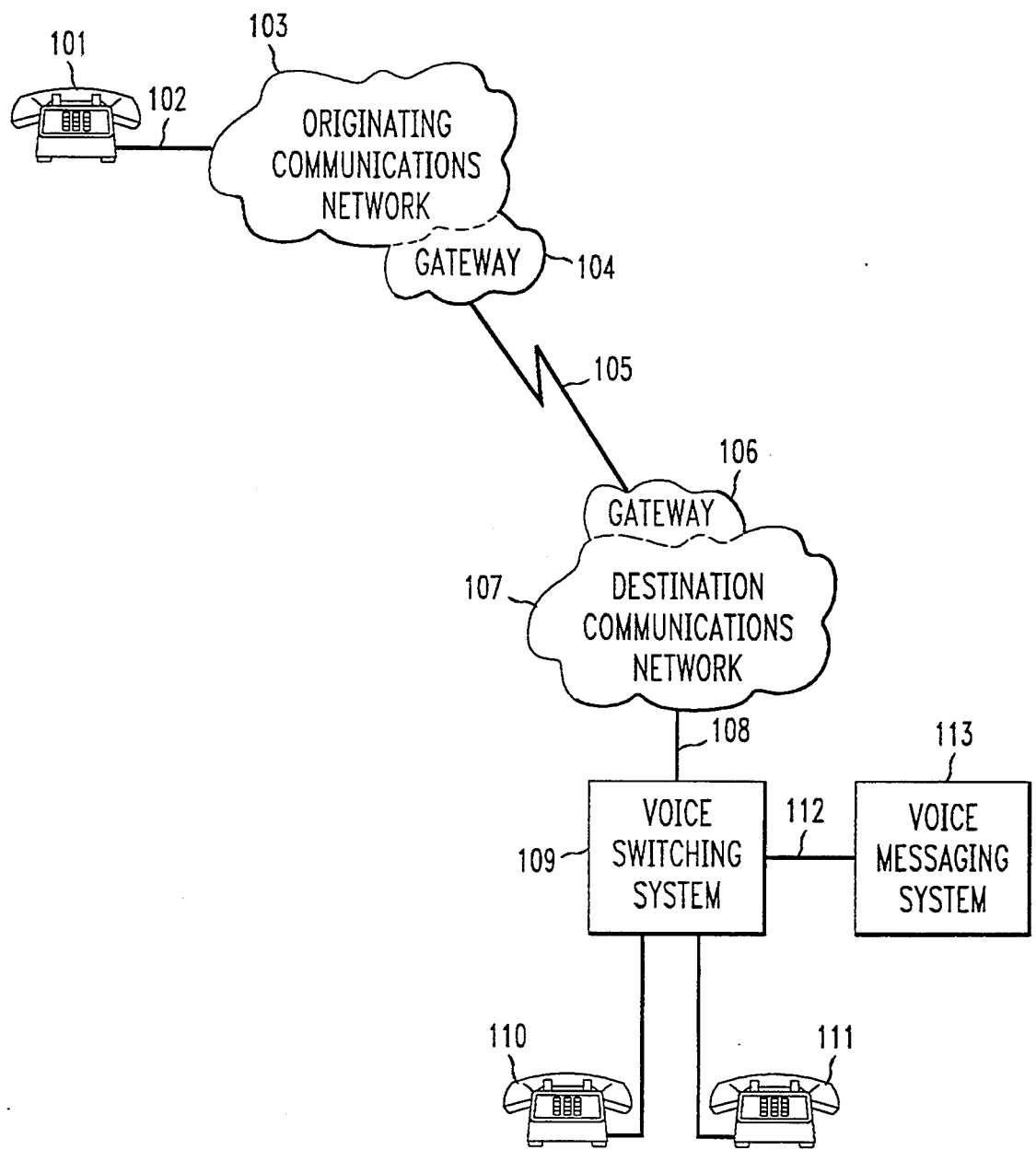
FIG. 1 illustrates the connectivity between a) a telecommunications network which routes a call from a caller to a called party, and b) a voice messaging system arranged in accordance with our invention to receive source information associated with a call and to deliver announcement(s) in the language of the caller.

FIG. 1 shows the connectivity between a) a telecommunications network which routes a call from a caller at station set 101 to a called party at station set 110 or 111, and b) voice messaging system 113 arranged in accordance with our invention to receive source information associated with a call and to deliver announcement(s) in the language of the caller.

As shown in FIG. 1, a call placed by a caller at station set 101 is routed along with the dialed digits to originating communications network 103 via local loop transmission facility 102. Communications network 103 includes means, such as local, toll and international gateway switches, and a signaling network, to process and route local, long distance and international telephone calls. In this example, the dialed digits indicate to originating communications network 103 that the call is destined for a different communications network at a distant location, such as a foreign country. Accordingly, communications network 103 generates control signals, including a) connection request signals, and b) destination and source information associated with the call, to establish a connection to a destination communications network 107 which includes similar means to those found in communications network 103. Communications network 107 uses the destination information received from originating communications network 103 via, for example, an out-of-band signaling channel of trunk 105, to route the call to voice switching system 109, which may be a PBX or a central office switch. In addition, destination communications network 107 uses its signaling network to forward source information associated with the call to voice switching system 109 via, for example, an out-of-band signaling channel of trunk 108. Voice switching system 109 then applies a ringing tone to the called party's station set, say station 111. The logic in voice switching system 109 is arranged so that a busy tone or ring-no-answer condition at station set 111, for example, triggers voice switching system 109 to forward not only the call but also source information associated with the call to voice messaging system 113. Typically, voice messaging system 113, upon receiving a call, greets the caller with either an announcement inviting him or her to leave a message, or a prompting announcement soliciting information from the caller in order to select further announcements. In accordance with our invention, the languages in which announcements or messages are transmitted to a caller are selected based on the source information received by voice messaging system 113, as fully described below.

Figure 2:
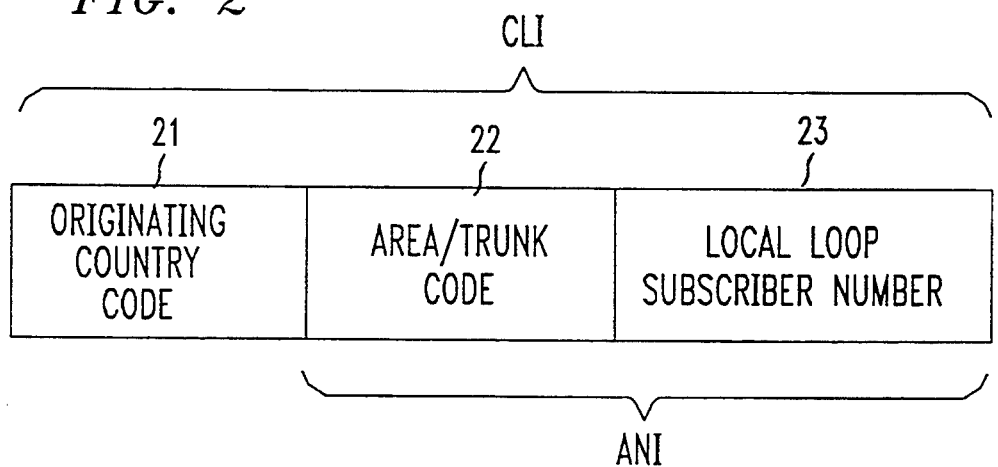
FIG. 2 shows the different fields that may be represented in the source information.

The aforementioned source information associated with a call is generated in communications networks 103 and/or 107, and passed along with the call to voice messaging system 113 of FIG. 1. FIG. 2 illustrates different fields that may typically be included in the source information. Originating country code 21 is a numeric field (typically one to three digits) indicating the region or country from which the call originated. Area or trunk code 22 is also a numeric field (typically one to three digits) designating a regional area served by a particular switching center or a trunk group. Local loop subscriber number 23 represents a numeric field (typically four to seven digits) representing the local telephone number of the caller. Source information comprising all three fields described above is commonly called "Calling Line Identity" (CLI) by persons skilled in the art. By contrast, when only area/trunk code field 22 and local loop subscriber number field 23 are included in the source information, the latter is referred to as "Automatic Number Identification" (ANI).

The type of source information received by voice messaging system 113 depends upon a) the specific capabilities of the switches and signaling networks within communications networks 103 and 107, gateway switches 104 and 106, and b) the "relationship" of the locations of communications networks 103 and 107. For example, when two countries (such as the United States and Canada) have a common originating country code (001) because they participate in a common numbering plan (North American Dialing Plan), originating communications network 103 forwards the ANI as opposed to the CLI to destination communications network 107. On the other hand, the source information may contain only the originating country code in other situations. For example, when a caller dials an international toll-free number that is forwarded by originating communications network 103 to destination communications network 107, the latter can extract the country code from the received dialed digits prior to translating them into a network routing number. Alternatively, when a call is received through the facilities of a dedicated trunk linking two countries exclusively, destination communications network 107 can identify the originating country code from a particular trunk subgroup number of that dedicated trunk.

Figure 3:
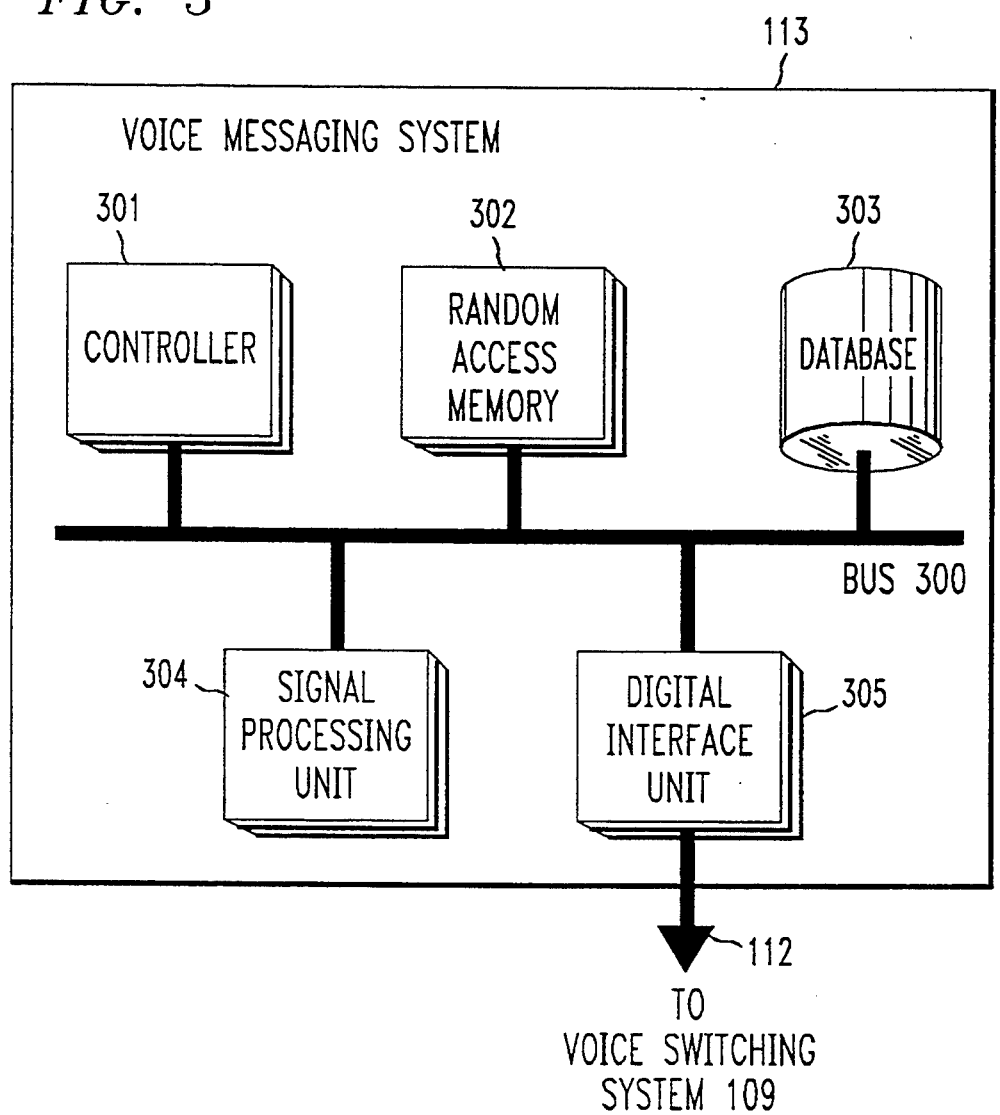
FIG. 3 illustrates an exemplary arrangement for the voice messaging system of FIG. 1 comprised of hardware components and software programs needed to implement our invention.

FIG. 3 illustrates an arrangement of voice messaging system 113 designed in accordance with our invention for announcement language selection, based on source information associated with a call. Voice messaging system 113 may be implemented using as a hardware platform, a personal computer or a minicomputer running software programs designed to perform specialized functions, such as delivering, recording, retrieving and storing voice messages. One well-known voice messaging system, which may be used with appropriate modifications to implement our invention, is the AT&T audio exchange (AUDIX) system. A voice messaging system arrangement similar to the architecture of the AUDIX system is disclosed in U.S. Pat. No. 4,790,003 issued to G. D. Kepley, et al. on Dec. 6, 1988 which is incorporated herein by reference.

As shown in FIG. 3, voice messaging system 113 includes controller 301, random access memory 302, database 303, signal processing unit 304, and digital interface unit 305, all interconnected by a bus 300. Database 303 includes, inter alia, program instructions which, when loaded into random access memory 302, are accessed and executed by controller 301, which is a central processing unit. Controller 301 supervises the operations of, and directs data traffic to and from, all the other components of the system via bus 300. In particular, controller 301, under the control of programs stored in database 303 manages the establishment and tearing down of connections between voice messaging system 113 and voice switching system 109 through the hardware and software facilities of digital interface unit 305. Additionally, controller 301 can issue instructions to query database 303 to retrieve a) records from the tables shown in FIGS. 4 and 5 (about to be described) and b) voice files representing system announcements or messages recorded in a plurality of languages, in accordance with the invention, and stored therein, advantageously in compressed format. Signal processing unit 304 is provided to decode and expand stored voice files into 64 kbps speech which is output to callers via digital interface unit 305.

Illustrated in FIG. 4 is a table stored in database 303 containing a list of different countries or geographic areas identified by name (country name) and country code (meaning originating country code described above). In FIG. 4, each row represents a record called a "national announcement selection record". This type of record is retrieved, for example, when the source information contains only the originating country code. The national announcement selection record is comprised of the country name, the country code, the number of dominant languages and the dominant language fields. The last two fields represent national linguistic information. More specifically, a significant number of countries have one dominant language which is indicated by a value of "1" in the number of dominant languages field. Some countries like Belgium, for example, have two dominant languages, namely French and Flemish listed in the dominant language(s) column in descending order of dominance.

FIG. 5 illustrates an exemplary language priority table stored in database 303 indicating the order of language dominance for different regions of a particular country. In FIG. 5, each row represents a record called a "regional announcement selection record" comprising the country name, the number of dominant languages spoken in that country, the area/trunk code, and the language priority array. This type of record is used for example when the source information contains only the ANI or when detailed regional linguistic information is needed for a multilingual country. The language priority array column lists, in descending order of dominance, languages spoken in areas of a country identified by the area/trunk codes.

FIG. 6 is a table illustrating a list of some countries in the North American Dialing Plan with corresponding country codes and dominant languages that may be stored in a database of the voice messaging system. In FIG. 6, the list of area codes for Canada is divided into two groups reflecting the order of language dominance for regions of Canada served by those area codes. For example, Quebec, a Canadian province in which French is the most dominant language, is served by area codes 514, 418 and 819. In all the other provinces of Canada, English is the most dominant language.

Figure 7:
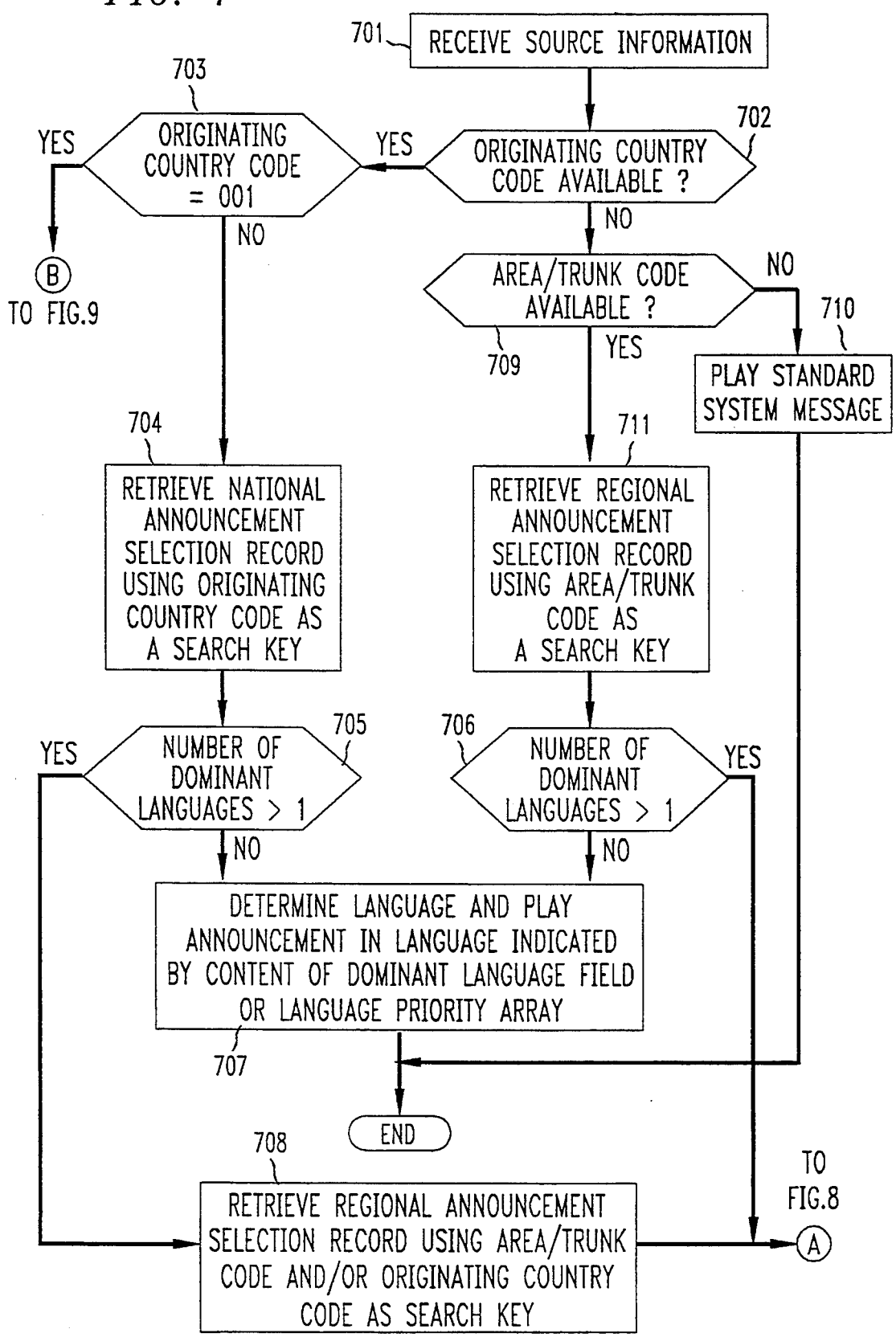
FIGS. 7 and 8, and 9 represent flow charts illustrating the process followed in voice messaging system 113 to implement the language selection features afforded by this invention.
Figure 8:
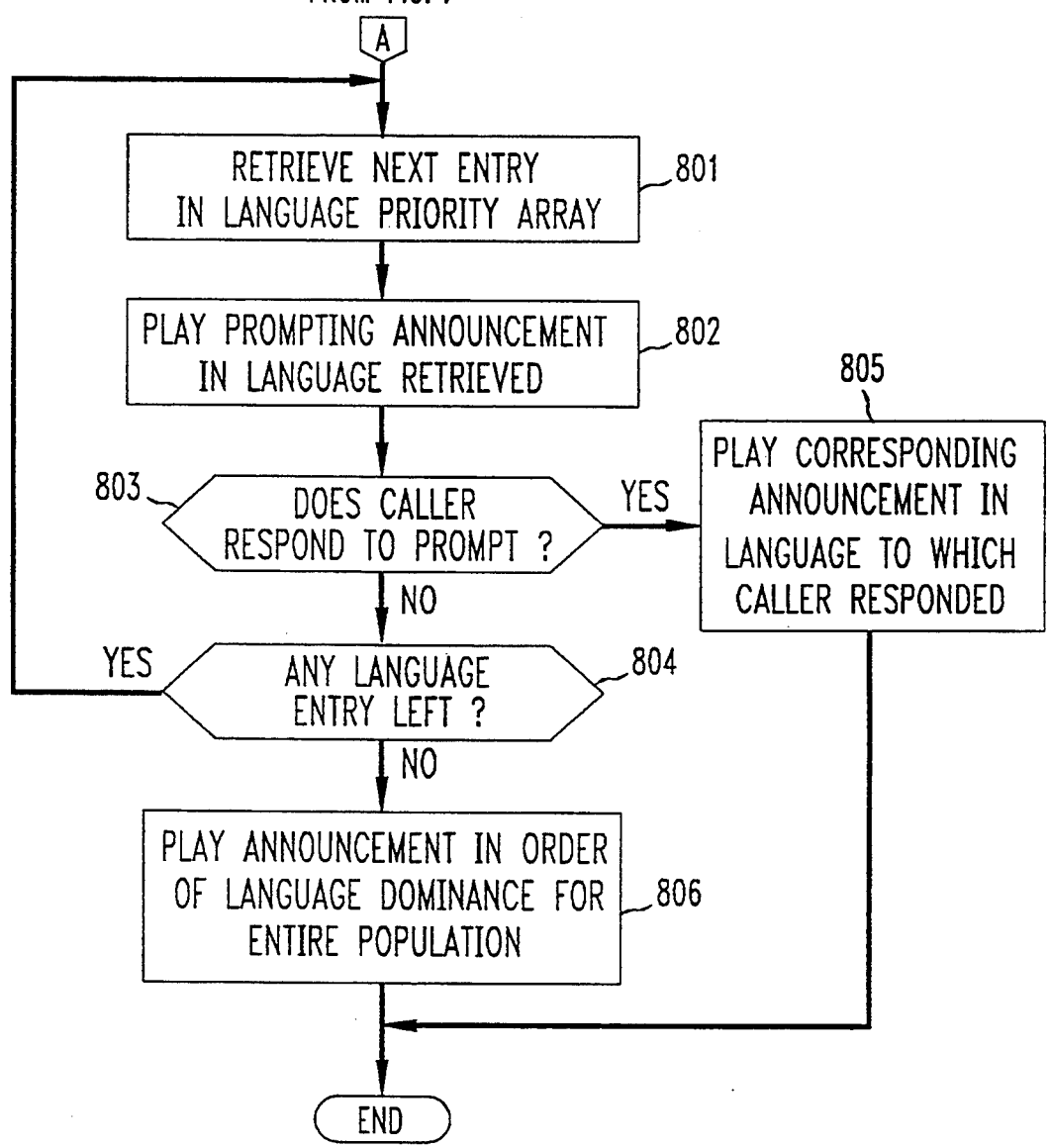

Referring to FIG. 7, the process contemplated by our invention, which is carried out under the control of controller 301, is initiated in step 701 when voice messaging system 113 receives the caller's source information (ANI, CLI or originating country code) in response, for example, to a busy or ring-no-answer condition at the called party's station set. In step 702, the received source information is analyzed to determine whether it contains an originating country code. Upon an affirmative answer to that inquiry, originating country code 21 is analyzed in step 703, to determine whether the call originated from a country or region participating in the North American Dialing Plan. As mentioned earlier, a value of "001" for originating country code 21 is indicative of a country's or region's participation in the North American Dialing Plan. If originating country code 21 has a value of "001", the steps described in FIG. 9 (discussed below) are executed by voice messaging system 113. Otherwise, database 303 is queried, in step 704, to retrieve the particular one of the national announcement selection records of FIG. 4 that is associated with the received country code. If originating country code 21 is not present in the source information, the latter is analyzed, in step 709, to determine whether area/trunk code 22 is included therein. If area/trunk code 22 is present in the source information, database 303 is queried in step 711, using the area/trunk code as a search key to retrieve the particular one of the regional announcement selection records (illustrated in FIG. 5) and that is associated with the received area/trunk code. In steps 705 and 706, voice messaging system 113 examines the number of dominant languages field to determine whether the country/geographical area is multilingual. The multilingual test is passed when the number of dominant languages field has any value greater than one. For a value of "1" in the number of dominant languages field, database 303 is queried to retrieve a stored message in the dominant language code indicated in the announcement selection record. The message may be a compressed binary file which is a digital representation of a prerecorded announcement. In step 707, database 303 forwards the retrieved binary voice file via bus 300 to signal processing unit 304, which decodes and expands the file into a 64 kbps speech output signal played to the caller. Note that other types of voice storage can also be used. If the number of dominant languages field has a value greater than "1", the instructions illustrated in FIG. 8 are executed. However, the regional announcement record is first retrieved in step 708 if it was previously determined in step 702, that the originating country code is available. It is worth noting that a regional announcement selection record is retrieved even in the case where no area code is available since there is an entry in the regional announcement selection record for that eventuality. If neither the originating country nor the area code is included in the source information, voice messaging system 113, in step 710, plays a standard system message to the caller.

Referring to FIG. 8, voice messaging system 113, in step 801, retrieves the first language in the language priority array from the record of FIG. 5. Using the techniques described above, voice messaging system 113, in step 802, plays a "prompting announcement" in the designated language. By prompting announcement, we mean a message inviting the caller to select a preferred language. In step 803, voice messaging system 113 determines within a predetermined time period whether the caller responds to the prompting announcement or ignores it. The latter alternative is indicative of the likely inability of the caller to understand the language in which the announcement was delivered. Thus, if silence of a predetermined duration, as opposed to a response to the prompting announcement, is detected, the logic in voice messaging system 113 is arranged to conclude that the caller cannot understand the prompting announcement in that language. As a result, in step 804, voice messaging system 113 determines whether there is another language entry left in the array. Upon an affirmative answer to that inquiry, steps 801 to 803 are repeated, playing prompting announcement(s) in another (other) language(s). If the caller, however, responds to the prompting announcement by entering, for example, dual tone multiple frequency (DTMF) signals (commonly known as touch tones), voice messaging system 113, in step 805 delivers a prerecorded system message using the same language in which the prompting announcement was played and to which the caller responded. The prerecorded system message may provide, for example, general information to the caller, such as an alternate telephone number for the called party to be reached. If the caller does not respond to any prompting announcement and there is no entry left in the array, voice messaging system 113, in step 806 delivers the system message several times in different languages, in descending order of language dominance prevalent for the entire population of the country/geographical area.

Figure 9:
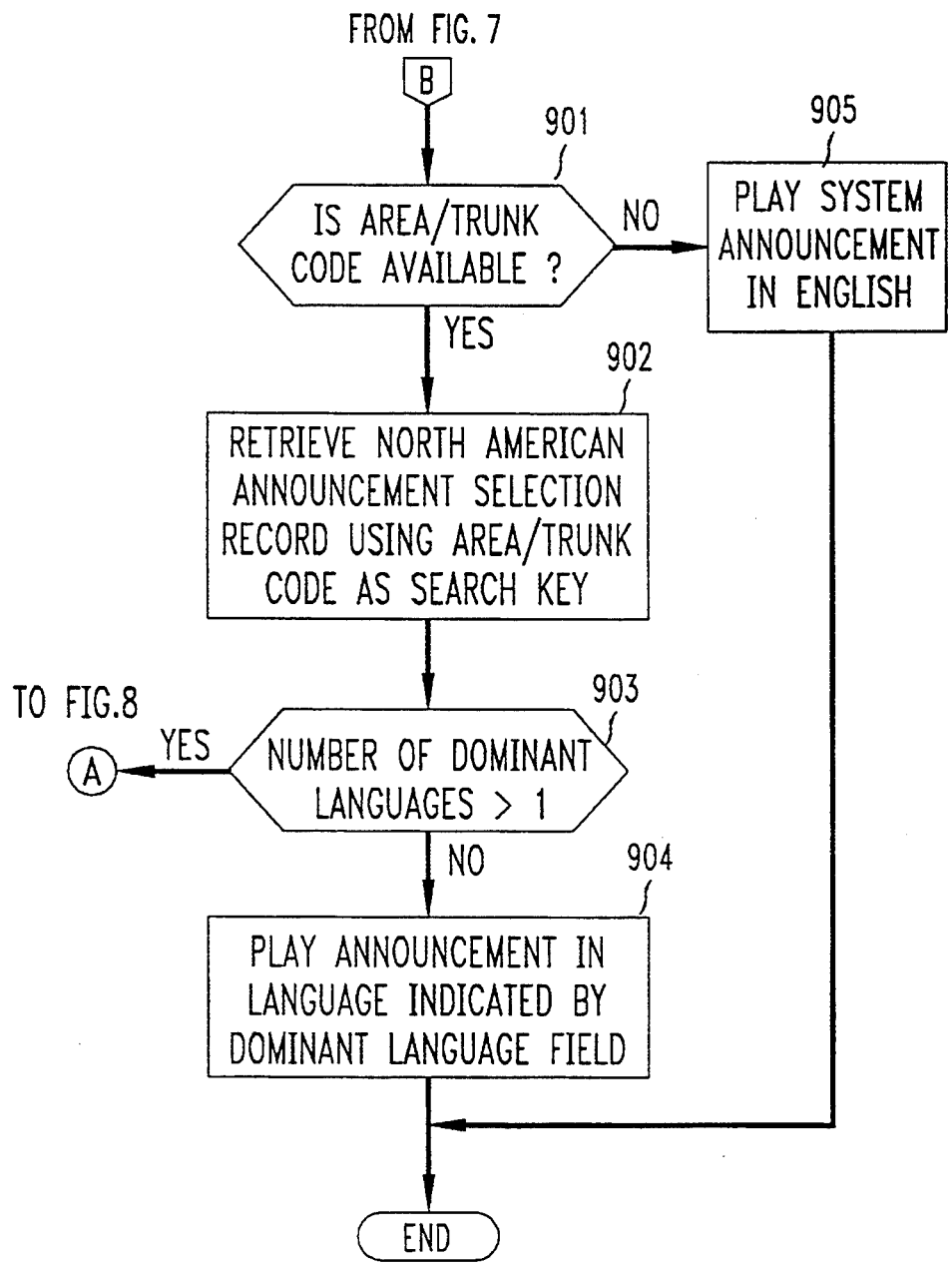

As mentioned earlier, if originating country code 21 has a value of "001", the instructions described in FIG. 9 are executed by voice messaging system 113. Referring to FIG. 9, voice messaging system 113 in step 901 determines whether area/trunk code 22 is included in the source information. Upon an affirmative answer to that inquiry, database 303 is queried, in step 902, to retrieve the North American announcement selection record of FIG. 6 associated with the received area/trunk code. In step 903, voice messaging system 113 examines the number of dominant languages field to determine whether the country/geographical area is multilingual. For a value of "1" in the number of dominant languages field, database 303 is queried, in step 904 to retrieve a stored message in the dominant language indicated by the dominant language field. For a value greater than "1" in the number of dominant languages field, the instructions illustrated in FIG. 8 and described above are executed by voice messaging system 113. If the source information does not include the area code, voice messaging system 113, in step 905, plays the system announcement in English.

To illustrate the operations of the multilingual aspect of our invention, let us take the example of a Canadian wholesaler placing a call to an exporter in Germany. Voice messaging system 113, upon receiving the caller's CLI, determines from country code 21 and area code 22 that the caller is located in Quebec, where the dominant language is French. An exemplary prompting announcement may convey the following message to the caller "Si vous parlez francais, pressez la touche 1", followed by a short pause, and the additional message "If you speak English, press 2". The first part of the announcement can be translated into English as follows: "If you speak French, press 1". If the caller presses 1, the system message is then played in French. Similarly, if the caller enters 2, the system message announcement is played in English.

By contrast, if voice messaging system 113 determines, based on the area code, that the caller is from an English-speaking province of Canada, the prompting announcement is first played in English followed by a short pause and the French prompting announcement.

The above description is to be construed as only an illustrative embodiment of this invention. Persons skilled in the art can easily conceive of alternative arrangements providing functionality similar to our invention without any deviation from the fundamental principles or the scope of this invention.

We claim:

1. A method of selecting languages in which a prestored message is to be delivered to a caller by a voice messaging system, wherein said method comprises the steps of:
   receiving in said voice messaging system call origination information comprised of one or more fields selected from a group which includes originating country code and area code, said fields being indicative of a country and a geographic area of a country respectively, of origin of a call placed by said caller;
   determining in said voice messaging system that two or more languages are spoken where said call originated;
   determining the order of dominance in which said languages are spoken in at least one of i) the country indicated by said country code, and ii) the geographic area indicated by said area code, said order of dominance specifying a most dominant language and subsequent next most dominant languages in descending order of language dominance;
   in response to receiving only a country code in said call origination information, presenting a message in the most dominant language spoken in the country indicated by said country code;
   in response to receiving an area code in said call origination information, presenting said message in said most dominant language spoken in the geographic area indicated by said area code; and
   in the absence of a response from said caller within a predetermined time period following the presentation of said message, delivering said message in the next most dominant language.

2. The method of claim 1, wherein more than two languages are spoken in said country or geographic area and wherein said method further includes the step of repeating the delivering step until a response is received from said caller.

3. The method of claim 1 wherein said message prompts said caller for language preference information and wherein said method further includes the step of responsive to said caller providing said language preference information, delivering an announcement in the language indicated by said caller.

4. A method of selecting at least one announcement among a plurality of announcements to be delivered to a caller each one of the announcements pre-recorded in a different language, and prestored in a voice messaging system along with national and regional linguistic information wherein said method comprises the steps of:
   receiving in said voice messaging system call origination information which i) is associated with a call placed by a caller, and ii) is indicative of at least one of the country and the region of origin of said call;
   comparing said call origination information to said national and regional linguistic information to determine a) at least one language spoken in at least one of said country and region of origin, and b) if more than one language is spoken at said at least one country and region of origin, the order of dominance in which said languages are spoken;
   if a single language is spoken at said at least one country and region of origin, delivering one of said announcements prerecorded in the language spoken at said at least one country and region of origin; and
   if at least two languages are spoken at said at least one country and region of origin, delivering at least two of said announcements, each one of said announcements being delivered in a different one of said spoken languages, and in descending order of language dominance.

5. A method of selecting announcements to be relayed to a caller through a voice messaging system wherein said method comprises the steps of:
   storing a) announcements prerecorded in a plurality of languages and b) a table that correlates particular languages to particular countries or regions, and that indicates the order of dominance of languages within a particular multilingual region or country,
   receiving in said voice messaging system call origination information which is i) associated with a call placed by said caller, and ii) indicative of a region of a zone from which said call was initiated;
   determining, based on said call origination information, whether said region is multilingual;
   if said region is multilingual, delivering an announcement to said caller in a first language indicated as the most dominant language in said region; and
   presenting at least one subsequent announcement to said caller in at least one different determined language, each announcement being presented in a different language and in descending order of language dominance.

6. The method of claim 5, wherein two or more languages are spoken at said region, and wherein said delivering and presenting steps comprises the steps of:
   prompting said caller for language preference information in each of said announcements.

7. A method of selecting from a plurality of announcements prerecorded in a plurality of languages at least one of said announcements to be delivered to a caller by a voice messaging system, wherein said method comprises the steps of:

receiving call origination information associated with a call from said caller and indicative of the point of origin of said call, said call origination information being comprised of one or more of the following fields: a country code, an area code, and a subscriber loop number;

if the call origination information includes the area code and the country code, retrieving, based on said call origination information, a first prestored table which is associated with said country code and which contains information indicative of one or more of the following: the number, type and order of dominance of languages spoken at said point of origin;

determining, based on said first table whether more than one language is spoken at said point of origin;

if said first table indicates that a single language is spoken at said point of origin, playing one of said prerecorded announcements in the language identified by said first table; and if said first table indicates that more than one language is spoken at said point of origin, i) retrieving from a prestored second table the type of and the order of dominance of languages associated with said area code; and ii) playing at least one announcement in each one of said languages which is spoken at said point of origin and which is associated with said area code.

8. The method of claim 7 further comprising the step of presenting an announcement prerecorded in the language of the called party if the country code and the area code are not included in the call origination information.

9. A system for selecting languages in which a prestored message is to be delivered to a caller by a voice messaging system, wherein said system comprises:

means for receiving in said voice messaging system call origination information comprised of at least one of the fields which include originating country code, and area code, said fields being indicative of the country and geographic area respectively, of origin of a call placed by said caller;

means for determining in said voice messaging system that two or more languages are spoken in said country or geographic area, and the order of dominance of said languages; and means responsive to receiving only the country code in said call origination information, for presenting a message in the most dominant language spoken in the country indicated by said country code;

means responsive to receiving the area code in said call origination information for presenting said message in the most dominant language spoken in the geographic area indicated by said area code; and means responsive to the absence of a response from said caller within a predetermined time period following the presentation of said message, for delivering said message in the next dominant language.

10. The system of claim 9 wherein more than two languages are spoken in said country or geographic area and wherein said system further includes means for delivering the message in one or more subsequent language in descending order of language dominance until a response is received from said caller.

11. The system of claim 9 wherein said message prompts said caller for language preference information and wherein said system further includes:

means responsive to said caller providing said language preference information, for playing a announcement in the language indicated by said caller.

12. A system for selecting at least one prestored announcement to be relayed to a caller through a voice messaging system storing a) announcements prerecorded in a plurality of languages, and b) national and regional linguistic information, said system comprising:

means for receiving in said voice messaging system call origination information which i) is associated with a call placed by said caller, and ii) is indicative of point of origin of said call;

means for comparing said call origination information to said national and regional linguistic information to determine at least one language spoken in said point of origin of said call;

means for delivering one of said announcements prerecorded in a particular language when said particular language is determined to be the single language spoken at said point of origin; and means responsive to the determination that two or more languages are spoken at said point of origin for playing at least two announcements, each announcement prerecorded in a different language spoken at said point of origin, and delivered in the order of language dominance at said point of origin.

* * * * *